United States Patent Office 2,897,224
Patented July 28, 1959

2,897,224

MANUFACTURE OF TRIALKYL PHOSPHITES

Harold Coates, Wombourne, and William Hubert Hunter, Shepton Mallet, England, assignors to Minister of Supply, in Her Majesty's Government of the United Kingdom of Great Britain and Northern Ireland, London, England No Drawing. Application September 9, 1952
Serial No. 308,727

Claims priority, application Great Britain
December 12, 1951

16 Claims. (Cl. 260—461)

This invention relates to the manufacture of trialkyl phosphites in an improved manner.

We have shown in a co-pending patent application (No. 308,726, now Patent No. 2,880,223) that the production of the cuprous halide complexes of trialkyl phosphites from cuprous halide, an alkanol and phosphorus trihalide is straightforward and that these complexes can be conveniently decomposed by heat to give dialkyl alkanephosphonates, notably dimethyl methanephosphonate, in good yield.

As disclosed in our application S.N. 308,726, the complex with cuprous chloride may be represented by the formula $(RO)_3P.CuCl$ and is advantageously produced by adding phosphorus trichloride to a mixture of cuprous chloride and an alcohol at low temperatures.

The cuprous halide which is most convenient is cuprous chloride and the phosphorus trihalide which is most convenient is phosphorus trichloride.

According to the present invention a process for the manufacture of trialkyl phosphites is provided wherein a trialkyl phosphite-cuprous halide complex is first produced and the said complex is subjected to treatment by which it is decomposed or decomplexed to liberate the trialkyl phosphite which is then separated from the reaction product.

Thus, according to the invention, by heating a trialkyl phosphite-cuprous chloride complex under vacuum and condensing the vapours evolved we obtain the trialkyl phosphite in good yield. An important advantage of this process is that the cuprous chloride is regained and is in a form suitable for re-use in the preparation of a further batch of cuprous chloride complex, without further treatment.

The trialkyl phosphite distilled off in this way contains a minor proportion of dialkyl alkanephosphonate which can be removed by fractionation.

Further, in accordance with the invention, we have also found that the above-mentioned cuprous halide complex may be decomposed by chemical means. Examples of such means are (1) heating the complex suspended in an inert solvent such as ethyl acetate with a finely divided metal which is capable of reducing the cuprous halide to metallic copper, for example zinc dust. (2) Alternatively, the decomposition may be carried out by refluxing in an inert solvent such as the alcohol corresponding to the ester groups of the phosphite in the presence of a reagent capable of transforming the cuprous halide into another copper salt which does not complex with the phosphite. As an example, a trimethyl phosphite complex may be refluxed with anhydrous sodium sulphide in methanol.

(3) A further alternative method of decomplexing the cuprous halide according to the invention consists in treating the complex with a reagent itself capable of forming a complex with for instance cuprous chloride which is more stable than the trialkyl phosphite-cuprous chloride complex, thus displacing the phosphite. As examples of such complexing agents we may cite pyridine and methyl cyanide.

The invention will now be described with the aid of the following examples:

*Example 1.*—Trimethyl phosphite-cuprous chloride complex (83 gms.) was spread in a thin layer on the bottom of a flask and heated in an oil bath up to a maximum temperature of 220° C., under reduced pressure (0.1 to 0.5 mm. Hg). The trimethyl phosphite commenced to distill off slowly at approximately 120° C. and was collected in a condensing system cooled to —75° C. The amount of trimethyl phosphite, contaminated with dimethyl methanephosphonate, recovered was 20 gm. The recovered cuprous chloride (63 gm.) was used again in the preparation of more complex. This cycle of operations was carried through three times without adding fresh cuprous chloride.

*Example 2.*—Trimethyl phosphite-cuprous chloride complex (50 gm.) in ethyl acetate (200 cc.) was refluxed for several hours with commercial zinc dust (30 gm.). The sludge of copper and zinc was filtered off and the ethyl acetate solution fractionated giving trimethyl phosphite in 70% yield.

*Example 3.*—A suspension of trimethyl phosphite-cuprous chloride complex (21 gm.) in methanol (50 cc.) was treated gradually with stirring with a solution of anhydrous sodium sulphide (4 gm.) in methanol (200 cc.). A black precipitate was formed with slight evolution of heat. At the end of the addition the mixture was refluxed for half an hour and then filtered. The filtrate was stripped of methanol and the residue distilled giving 6 gm. trimethyl phosphite, B.P. 110° C. (60% yield).

*Example 4.*—Trimethyl phosphite-cuprous chloride complex (25 gm.) was treated with methyl cyanide and the mixture distilled. Some methyl cyanide distilled off, followed by trimethyl phosphite (7 gm.), B.P. approximately 110° C.

We claim:

1. Process for the production of lower unsubstituted trialkyl phosphites, which process comprises reacting a cuprous halide with phosphorus trichloride and with a lower unsubstituted alkanol to produce a cuprous halide-trialkyl phosphite complex and subjecting the said complex to controlled decomposition under conditions which liberate the trialkyl phosphite.

2. Process which comprises subjecting a cuprous halide-trialkyl phosphite complex to chemical decomposition by a reagent which removes the cuprous halide component of the said complex and liberates the trialkyl phosphite.

3. Process which comprises reacting a cuprous halide-trialkyl phosphite complex with a finely divided metal capable of reacting with the cuprous halide component of the complex to liberate the trialkyl phosphite.

4. Process which comprises decomposing a cuprous halide-trialkyl phosphite complex by heating the said complex with zinc dust to liberate the trialkyl phosphite.

5. Process which comprises decomposing a cuprous halide-trialkyl phosphite complex by a reagent which reacts with the cuprous halide component to form a copper compound which does not complex with the trialkyl phosphite and thereby liberates the said trialkyl phosphite.

6. Process which comprises decomposing a cuprous halide-trialkyl phosphite complex by a soluble reactive sulphide to liberate the trialkyl phosphite.

7. Process as claimed in claim 6, which comprises decomposing a cuprous chloride-trialkyl phosphite complex by reaction with sodium sulphide to liberate the trialkyl phosphite.

8. Process which comprises decomposing a cuprous halide-trialkyl phosphite complex by a reagent which itself is capable of forming a complex with the cuprous halide, which complex is more stable than the said cuprous halide-trialkyl phosphite complex and thus liberates the trialkyl phosphite.

9. Process which comprises decomposing a cuprous halide-trialkyl phosphite complex with pyridine which forms a stable complex with the cuprous halide and liberates the trialkyl phosphite.

10. Process which comprises decomposing a cuprous halide-trialkyl phosphite complex with an alkyl cyanide for example methyl cyanide, to liberate the trialkyl phosphite.

11. Process which comprises decomposing a cuprous chloride-trimethyl phosphite complex with a reagent which reacts to form a stable complex with the cuprous chloride and liberates trimethyl phosphite.

12. A process for the production of a lower unsubstituted trialkyl phosphite which comprises heating a lower unsubstituted trialkyl phosphite-cuprous halide complex under a pressure substantially lower than atmospheric at a temperature sufficient to cause decomposition of said complex, said pressure being sufficiently low that said decomposition gives said trialkyl phosphite as a principal decomposition product.

13. A process according to claim 12 wherein said pressure is of the order of 0.1 to 0.5 mm. Hg abs.

14. A process for the production of lower unsubstituted trialkyl phosphites which comprises subjecting a cuprous-chloride-trialkyl phosphite complex of the formula $(RO)_3P \cdot CuCl$, where R is a lower unsubstituted alkyl group, to distillation in the form of a thin layer under a pressure of the order of 0.1 to 0.5 mm. Hg abs. thereby producing a trialkyl phosphite distillate.

15. A process of producing trimethyl phosphite which comprises heating trimethyl phosphite-cuprous chloride complex $(CH_3O)_3P \cdot CuCl$, in a thin layer at a temperature in the range of substantially 120° C. to 220° C. and at a pressure in the range of substantially 0.1 to 0.5 mm. Hg abs., and condensing the vapors evolved.

16. A process for producing a lower unsubstituted trialkyl phosphite which comprises reacting a cuprous halide with phosphorus trichloride and a lower unsubstituted alkanol to produce a cuprous halide-trialkyl phosphite complex then heating said complex under a pressure substantially lower than atmospheric at a temperature sufficient to cause decomposition of said complex, said pressure being sufficiently low that said decomposition gives said trialkyl phosphite as a principal decomposition product.

References Cited in the file of this patent

UNITED STATES PATENTS

| 2,005,619 | Graves | June 18, 1935 |
| 2,193,252 | Kyrides | Mar. 12, 1940 |
| 2,599,326 | Gruen et al. | June 3, 1952 |

OTHER REFERENCES

Arbuzov: Chem. Abs., 29, 2146 (1935).